(12) United States Patent
Fasen et al.

(10) Patent No.: US 7,142,500 B2
(45) Date of Patent: Nov. 28, 2006

(54) SENSOR WITH VARYING CAPACITANCE BASED ON RELATIVE POSITION BETWEEN OBJECTS

(75) Inventors: Donald J. Fasen, Boise, ID (US); Storrs T. Hoen, Brisbane, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 521 days.

(21) Appl. No.: 10/043,970

(22) Filed: Jan. 11, 2002

(65) Prior Publication Data

US 2003/0133372 A1 Jul. 17, 2003

(51) Int. Cl.
*G11B 9/00* (2006.01)

(52) U.S. Cl. ...................................... 369/126
(58) Field of Classification Search ................ 324/660, 324/686; 369/43, 44.11, 101, 53.28
See application file for complete search history.

(56) References Cited

U.S. PATENT DOCUMENTS

| 4,841,225 | A | * | 6/1989 | Meyer | 324/660 |
|---|---|---|---|---|---|
| 4,879,508 | A | * | 11/1989 | Andermo | 324/690 |
| 4,893,071 | A | * | 1/1990 | Miller | 324/660 |
| 5,304,937 | A | * | 4/1994 | Meyer | 324/686 |
| RE34,741 | E | * | 9/1994 | Andermo | 324/690 |
| 5,418,771 | A | * | 5/1995 | Kasanuki et al. | 369/126 |
| 5,708,367 | A | * | 1/1998 | Tousson | 324/660 |
| 5,861,754 | A | * | 1/1999 | Ueno et al. | 324/660 |
| 5,896,032 | A | * | 4/1999 | Yagi et al. | 324/660 |
| 5,896,232 | A | | 4/1999 | Budd et al. | |
| 6,072,318 | A | * | 6/2000 | Jordil | 324/660 |
| 6,504,385 | B1 | | 1/2003 | Hartwell et al. | |
| 6,738,336 | B1 | * | 5/2004 | Naberhuis | 369/101 |
| 6,776,042 | B1 | | 8/2004 | Pike et al. | |
| 2001/0032508 | A1 | * | 10/2001 | Lemkin et al. | 73/514.32 |
| 2002/0179983 | A1 | * | 12/2002 | Hartwell et al. | 257/415 |

* cited by examiner

*Primary Examiner*—Andrea Wellington
*Assistant Examiner*—Lixi Chow (57) ABSTRACT

A position sensor for use in connection with a movable system having a pair of objects that are configured to move relative to one another along an axis through an operative range of motion. The position sensor includes a first plate secured to one of the objects and a pair of second plates secured to the other of the objects. The second plates are adjacent each other and coplanar. The first plate and second plates are configured so that the second plates are spaced from and parallel to the first plate as the objects move relative to one another along the axis. The first plate and second plates are configured so that they form two variable, spaced-plate capacitors having capacitances that vary as the objects move relative to one another within the operative range along the axis. The position sensor is configured to use the capacitances to generate output usable to determine relative position of the objects along the axis.

12 Claims, 5 Drawing Sheets

FIG. 1

SECTION A-A

SENSOR WITH VARYING CAPACITANCE BASED ON RELATIVE POSITION BETWEEN OBJECTS

TECHNICAL FIELD

The invention relates to capacitance-based position sensors configured to produce output capacitance that varies with the relative position of a pair of movable objects.

BACKGROUND OF THE INVENTION

Use of capacitance to measure relative position between two objects is widely known. One method of position sensing involves affixing two conductive plates to the objects that are to move relative to one another. The plates typically are secured to the objects so that they overlap and are parallel to each other, and are spaced by a gap. The two plates, together with an interposed dielectric (e.g., air) produce a capacitance which depends, in part, on the extent to which the plates overlap each other. As the objects move, the amount of overlap changes, resulting in a corresponding change in capacitance. From the capacitance change, the amount of relative displacement between the objects is determined.

One difficulty with the above approach is that various factors may contribute to a given change in capacitance. Assuming a rectilinear x-y-z coordinate system with a pair of conductive plates that are parallel to the x-y plane, capacitance variations will result from relative translation occurring between the plates along all three of the coordinate axes. However, many position sensing systems, including the simple system described above, cannot differentiate between a capacitance change resulting from motion occurring along one axis from a capacitive change due to motion occurring along another axis.

The above problem is of particular concern in certain types of micro electro-mechanical systems (MEMS), such as in very small computer storage devices. Some such storage devices include a storage medium that is designed to move within an x-y plane relative to an associated read/write device. To accurately access and write data to the medium, the exact relative position of the storage medium and read/write device must be known. The electrostatic drive mechanisms and other actuating mechanisms used with these devices typically are effective at producing x-y motion, however they sometimes produce incidental z-axis motion. The conventional capacitance position sensing system described above can produce erroneous position readings in the event of such incidental z-axis movement, for the reasons explained above. This may result in, among other things, the wrong data being read out, or in the accidental overwriting of existing data.

Another problem with existing capacitance-based position sensors is limited sensitivity. Particularly in micro storage devices and other MEMS systems, it desirable that the employed position sensor produce an output that varies significantly as a function of a given change in position. In some storage devices, position must be measured in fractions of a nanometer. Many existing sensors simply are not sensitive enough to provide output suitable for determining position to that fine a resolution.

SUMMARY OF THE INVENTION

Accordingly, the present invention provides a position sensor for use in connection with a movable system that has a pair of objects that are movable relative to one another through an operative range of relative motion along an axis. The position sensor is capacitance-based, and includes a first plate secured to one of the objects so that the first plate is parallel to the axis. The sensor also includes a pair of second plates secured to the other of the objects so that the second plates are adjacent and coplanar, and so that the second plates are spaced from, and parallel to, the first plate as the objects move relative to one another along the axis. The first plate and second plates are configured so that they form two spaced-plate capacitors having capacitances that vary as the objects move relative to one another within the operative range along the axis. The position sensor is configured to use the capacitances to generate output usable to determine relative position of the objects along the axis.

DETAILED DESCRIPTION OF THE INVENTION

The present invention is directed to a capacitance-based position sensor. The position sensor embodiments described herein may be used in a variety of settings, but have proven particularly advantageous when used in very small computer storage devices and other MEMS systems. For purposes of illustration only, the position sensor embodiments described below will be discussed primarily in the context of a high-density MEMS computer storage device.

Figure 1:
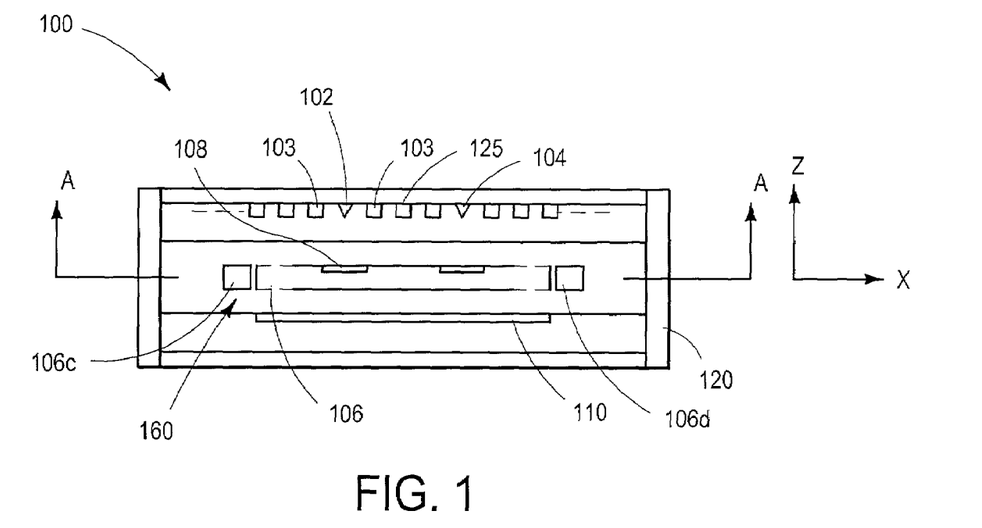
FIGS. 1–3 show different perspectives of a computer storage device including a capacitance-based position sensor according to one embodiment of the present invention.
Figure 2:
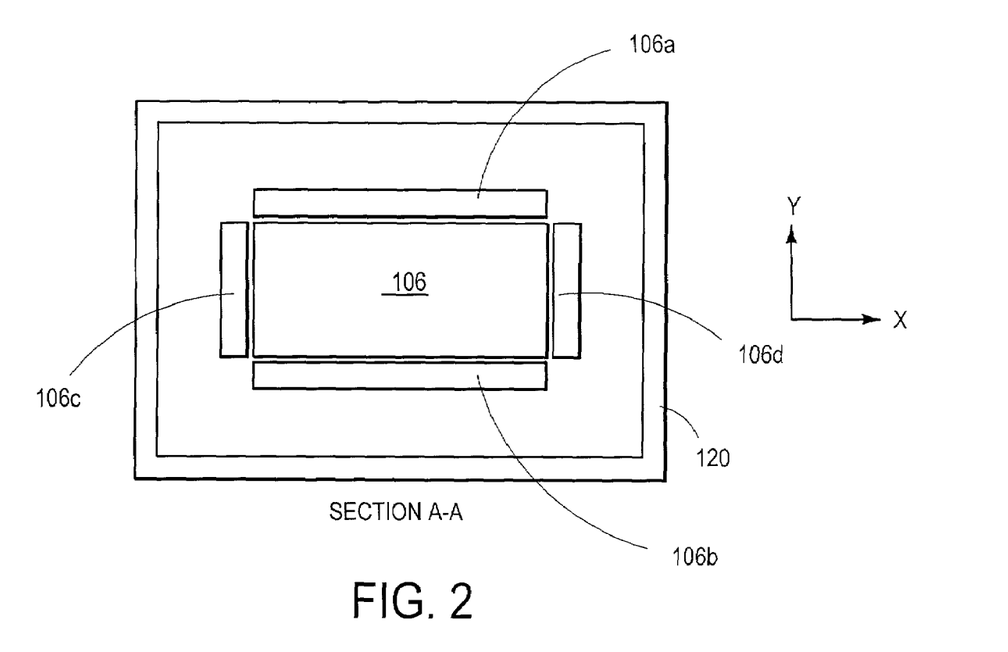

FIGS. 1 and 2 respectively show side and top cross section views of a storage device 100, with which a position sensor according to the invention may be used. Storage device 100 includes a number of field emitters, such as 102 and 104, a storage medium 106 with a number of storage areas, such as 108, and a microactuator 110, which scans (moves) the storage medium 106 with respect to the field emitters or vice versa. Storage device 100 may be configured so that each storage area is responsible for storing one bit or many bits of information.

The field emitters may be configured as point-emitters having very sharp points. For example, each field emitter may have a radius of curvature of about one nanometer to hundreds of nanometers. During operation, a preselected potential difference is applied between a field emitter and its corresponding gate, such as between emitter 102 and circular gate 103 surrounding emitter 102. Due to the sharp point of the emitter, an electron beam current is extracted from the emitter and directed with a high degree of precision towards the storage area. Depending on the distance between the emitters and storage medium 106, the type of emitters, and the spot size (bit size) required, electron optics may be desired to focus the electron beams. A voltage may also be applied to storage medium 106 to either accelerate or decelerate the field-emitted electrons or to aid in focusing the field-emitted electrons.

Casing 120 typically is adapted to maintain storage medium 106 in partial vacuum, such as at least $10^{-5}$ torr. Researchers have produced microfabricated field emitters in vacuum cavities using semiconductor processing techniques. See, for example, "Silicon Field Emission Transistors and Diodes," by Jones, published in IEEE Transactions on Components, Hybrids and Manufacturing Technology, 15, page 1051, 1992.

Each field emitter may correspond to one or more storage areas provided on storage medium 106. Where each field emitter is responsible for a number of storage areas, storage device 100 typically is adapted to scan or otherwise effect relative movement between casing 120 (and thus, the field emitters) and storage medium 106. For example, microactuator 110 typically is adapted to scan medium 106 to different locations, so that each field emitter is positioned above different storage areas. With such a configuration, microactuator 110 can be used to scan an array (typically two-dimensional) of field emitters over the storage medium. Because storage medium 106 moves relative to casing 120, it will at times be referred to as the "mover." Correspondingly, casing 120 and various other components that are fixed relative to the casing (e.g., the field emitters) will be at times referred to as the "stator."

The field emitters typically are configured to read and write information on the storage areas via electron beams they produce. Thus, field emitters suitable for use with storage device 100 must produce electron beams narrow enough to achieve the desired bit density on storage medium 106. Further, the field emitters must provide electron beams of sufficient power density to perform the desired read/write operations. A variety of methods may be used to fabricate such field emitters. For example, one method is disclosed in "Physical Properties of Thin-Film Field Emission Cathodes With Molybdenum Cones," by Spindt et al, published in the Journal of Applied Physics, Vol. 47, No. 12, December 1976. Another method is disclosed in "Fabrication and Characteristics of Si Field Emitter Arrays," by Betsui, published in Tech. Digest 4th Int. Vacuum Microelectronics Conf., Nagahama, Japan, page 26, 1991. Such emitters have been successfully employed in various applications, such as in flat panel displays.

The field emitters may be provided as a two-dimensional array (e.g., 100 by 100 emitters), with an emitter pitch of 50 micrometers in both the x and the y-directions. Each emitter may access bits in tens of thousands to hundreds of millions of storage areas. For example, the emitters may scan over (i.e., move relative to) a storage medium that has a two dimensional array of storage areas, where the periodicity between adjacent storage areas is anywhere from a fraction of a nanometer to 100 or more nanometers, and where the operational range of the microactuator is 50 micrometers in both the x and y-directions. Also, the field emitters may be addressed simultaneously or in a multiplexed manner. Parallel addressing schemes may provide storage device 100 with significant performance enhancements in terms of access time and data rate.

Figure 3:
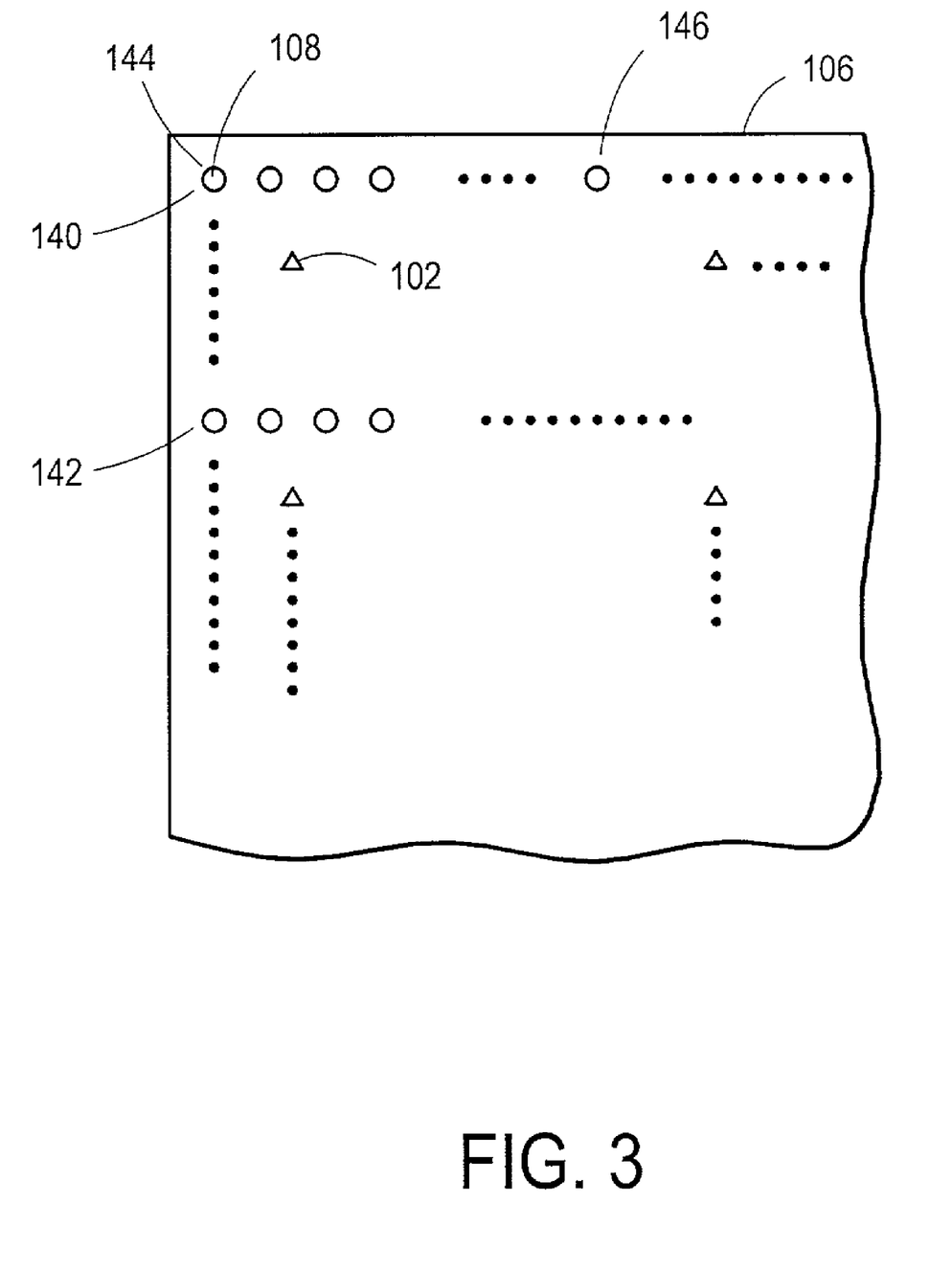

FIG. 3 is a top view of an exemplary storage medium 106, depicting a two dimensional array of storage areas and a two dimensional array of field emitters. External circuitry (not shown) is used to address the storage areas. As indicated, it will often be desirable to segment the storage medium into rows, such as row 140, where each row contains a number of storage areas, such as storage area 108. Typically, each emitter is responsible for a number of rows, but is not responsible for the entire length of those rows. For example, as depicted, emitter 102 is responsible for the storage areas within rows 140 through 142, and within columns 144 through 146.

The foregoing describes an exemplary storage device with which a position sensor according to the present invention may be used. Other aspects of this type of storage device are disclosed in U.S. Pat. No. 5,557,596 to Gibson et al., the disclosure of which is incorporated herein by this reference.

To accurately perform read and write operations on the desired storage areas, it will often be desirable to employ precise position sensing and control in connection with the operation of microactuator 110. Accordingly, storage device 100 may be provided with a capacitance-based position sensor according to the present invention. One such position sensor is indicated generally at 160 in FIG. 1. Sensor 160 outputs one or more capacitance values which vary with the relative position of mover 106 and stator 120.

Various embodiments and aspects of the position sensor will be described with reference to FIGS. 4–16. Similar to FIGS. 1 and 2, several of these figures will have an accompanying legend indicating orientation of the depicted subject matter within a rectilinear x-y-z coordinate system. The legends are included for purposes of clarity only, and are not intended to limit the scope of the invention. For example, storage medium 106 moves primarily within the x-y plane shown in FIGS. 1 and 2. Accordingly, when the to-be-described position sensors are used with storage device 100, they typically are designed to sense position of the storage medium within the x-y plane. It will be appreciated, however, that the position sensors may be used to sense movement in many different desired directions, including planes other than the arbitrarily-defined x-y plane shown in FIGS. 1 and 2.

FIGS. 4–8 depict various aspects of a position sensor 162 according to the present invention. As seen in FIGS. 4–7, sensor 162 may include a number of plate assemblies which each have one or more plates, including an M1 plate assembly 164 having M1 plates 166 and 168, an M2 plate assembly 170 having M2 plates 172 and 174, and an S1 plate assembly 176 having S1 plates 178 and 180.

Figure 4:
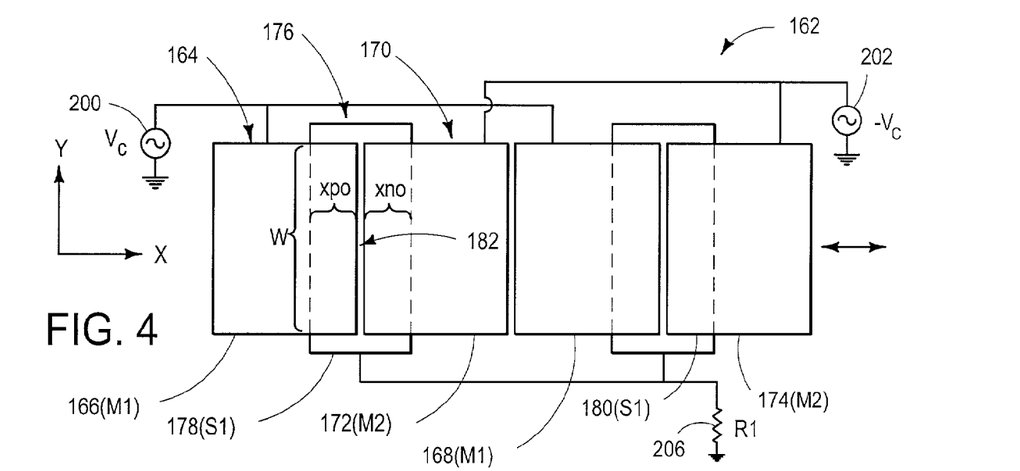
FIG. 4 is a schematic top view of a capacitance-based position sensor according to the present invention.

The M1 and M2 plate assemblies may be fixedly secured to storage medium 106 (FIGS. 1 and 2), and are designated with the letter "M" because in the depicted example, storage medium 106 and the M1 and M2 plates are movable relative to casing 120. Typically, as indicated in FIG. 4, all of the M1 plates are electrically interconnected, and all of the M2 plates are electrically interconnected. Insulating gaps 182 are provided between adjacent M1 and M2 plates, such that the M1 and M2 plate assemblies are insulated from each other.

S1 plate assembly 176 and its plates are designated with the letter "S" because they typically are stationary relative to casing 120. As shown, S1 plates 178 and 180 typically are electrically interconnected. The electrical interconnections and properties of the depicted plates will be described in more detail below.

Figure 5:
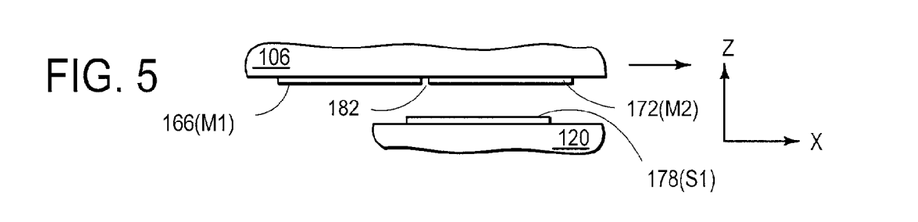
FIGS. 5–7 are side views depicting portions of the position sensor of FIG. 4, as attached to a pair of objects moving relative to one another through a range of x-axis motion.
Figure 6:
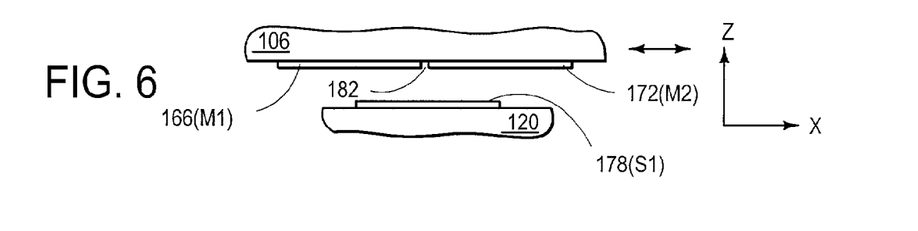
Figure 7:
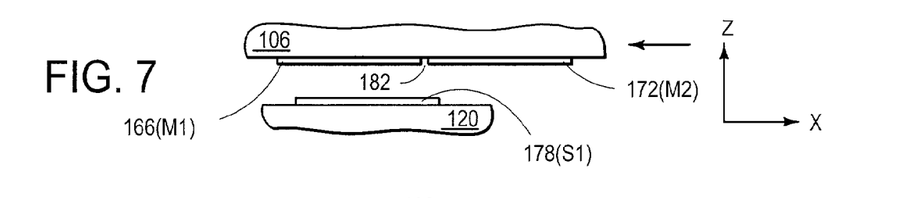

As best seen in FIGS. 5–7, M1 plates 166 and 168 may be secured to the underside of storage medium 106 (i.e., the mover). More particularly, as indicated in FIGS. 5–7, the M1 plates may be secured to one or more coupling blocks provided toward the edges of the storage medium. In the depicted storage device, there are two sets of coupling blocks. X-axis coupling blocks 106a and 106b extend in the x-direction along the top and bottom side of storage medium 106, and y-axis coupling blocks 106c and 106d extend along in the y-direction along the left and right sides of the storage medium. The x-axis coupling blocks 106a and 106b move with storage medium as it moves along the x-axis, but do not move with the storage medium as it moves along the y-axis. In other words, coupling blocks 106a and 106b are fixed relative to storage medium 106 for purposes of y-axis motion, but independent of storage medium 106 for purposes of y-axis motion. Y-axis coupling blocks 106c and 106d work in a similar but opposite manner: they are fixed relative to the storage medium for purposes of y-axis motion, but are independent of the storage medium for purposes of x-axis motion. Use of such coupling blocks is described in U.S. patent application Ser. No. 09/867,667, filed May 31, 2001 of Peter G. Hartwell and Donald J. Fasen for a "Flexure Coupling Block for Motion Sensor," and U.S. patent application Ser. No. 09/867,666, filed May 31, 2001 of Peter G. Hartwell and Donald J. Fasen for a "Three-Axis Motion Sensor," the disclosures of which are incorporated herein by this reference. Accordingly, the coupling blocks will not be further described here.

Those skilled in the art will appreciate that the M1 and M2 plate assemblies of position sensor 162 may be affixed directly to the body of storage medium 106, instead of being operatively affixed thereto via coupling blocks. The S1 plates typically are fixedly secured to or mounted within casing 120 (i.e., the stator) so that they face the M1 and M2 plates.

As best seen in FIGS. 5–7, the M1, M2 and S1 plates typically are planar structures that are fairly thin relative to mover 106 and stator 120. The plates may be deposited on the mover and stator, or otherwise secured thereto, using semiconductor fabrication techniques or other suitable methods of manufacture. As indicated, the M1 and M2 plate assemblies typically are secured to storage medium 106 so that the M1 and M2 plate assemblies are adjacent each other, coplanar and separated by insulating gaps 182. In addition to being coplanar to the M2 plates, each M1 plate typically is coplanar with all of the other M1 plates. For example, in FIG. 4, all four of the M1 and M2 plates are coplanar, such that they collectively form a planar expanse having intermittent gaps (e.g., insulating gaps 182). As will be appreciated from FIGS. 5–7, this expanse faces downward toward the S1 plates and stator 120. Typically, all of the S1 plates are also coplanar to one another.

Mover 106 and stator 120 normally are movable relative to one another so that they may move only in a translational (non-rotational sense). Accordingly, S1 plates 178 and 180 remain parallel to the M1 plates 166 and 168, and to the M2 plates 172 and 174 as mover 106 moves relative to stator 120. In the event of z-axis motion occurring between the mover and the stator, the perpendicular gap between the S1 plates and the plane containing the M1 and M2 plates will vary, however the S1 plates typically remain parallel to the M1 and M2 plates.

FIGS. 5–7 depict relative x-axis motion that may occur between mover 106 and stator 120. FIG. 5 depicts mover 106 at one extreme of its operative range of x-axis motion; FIG. 7 depicts the mover at the opposite extreme; and FIG. 6 depicts the mover at an intermediate location. As seen in these figures, the overlap occurring between S1 plate 178 and M1 plate 166, and between S1 plate 178 and M2 plate 172, varies as the mover moves between the extremes of its operative range of x-axis motion. "Overlap" refers to the overlapping area of a given pair of opposed plates. For example, FIG. 4 depicts the M1 and M2 plates, which are all fixed relative to mover 106, in an intermediate position (i.e., somewhere between the ends of its range of operative motion) relative to the S1 plates, similar to the intermediate position shown in FIG. 6. At this point, M1 plate 166 overlaps S1 plate 178 by xpo (the x-axis amount of overlay) times W (the y-axis width of the M1 plate). It should be appreciated from FIGS. 4–7 that the overlap varies as a function of relative x-axis displacement occurring between the plates, which in turn results from relative x-axis motion occurring between mover 106 and stator 120.

The space between the S1 plates and the M1 and M2 plates is occupied by a dielectric, such as air, and those skilled in the art will thus appreciate that capacitances are formed between the various plates. These capacitances vary as mover 106 moves relative to stator 120.

Figure 8:
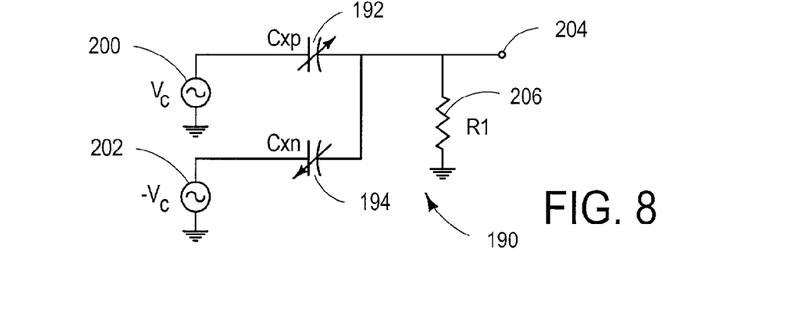
FIG. 8 is a depiction of a circuit model associated with the position sensor shown in FIGS. 4–7.

FIG. 8 depicts the capacitances formed by the various plates shown in FIGS. 4–7, as included in a capacitance measuring circuit 190. Circuit 190 includes a first variable capacitor 192, which is formed by the M1 plate assembly (M1 plates 166 and 168) and the S1 plate assembly (S1 plates 178 and 180). As indicated by the arrow in the circuit symbol for capacitor 192, the capacitance of variable capacitor 192 increases as mover 106 moves in the positive x-direction relative to stator 120 from the position shown in FIG. 5 to the position shown in FIG. 7. This increase in capacitance is due to the increase in overlap between the M1 plates and the S1 plates. Circuit 190 also includes a second variable capacitor 194, which is formed by the M2 plate assembly (M2 plates 172 and 174) and the S1 plate assembly (S1 plates 178 and 180). The downward directed arrow indicates that capacitance of variable capacitor 194 decreases as mover 106 moves in the positive x-direction relative to stator 120 over the operative range of x-axis motion from the position shown in FIG. 5 to the position shown in FIG. 7. The decreased capacitance is the decrease in overlap between the M1 plates and the S1 plates as the mover moves through the described range of motion.

As seen in FIGS. 4 and 8, the capacitance measuring circuit may also include a signal source or sources to apply time-varying signals to the plates. These input signals are applied in order to produce measurable output signals based on the capacitance existing between the plates. In the depicted embodiment, a sinusoidal carrier 200 is applied to the M1 plate assembly (M1 plates 166 and 168). An inverted carrier 202 is applied to M2 plate assembly 170 (M2 plates 172 and 174). Where sinusoidal inputs are used, the inverted signal typically is produced by shifting the phase of the first signal by 180 degrees. Application of these time varying signals causes an output to be produced at circuit node 204, which can be measured to determine the capacitance of the variable capacitors 192 and 194. As seen in FIG. 8, one way of measuring the output is with a voltage-sampling resistor 206 of resistance R1.

A significant advantage of the configurations described with reference to FIGS. 4–8 is that the output varies to a significant extent only as a function of x-axis displacement occurring between mover and stator, and is relatively insensitive to relative y-axis and z-axis displacements. This isolation of rectilinear components aids in accurate position sensing. Those skilled in the art will appreciate that the capacitance occurring between a pair of spaced parallel x-y plates is a function of overlapping area (which varies with relative x-axis and y-axis motion), and of the perpendicular distance between the plates (which varies with relative z-axis motion). Namely, capacitance C=(A*Eo)/G, where A is the area of overlap; Eo is a constant corresponding to the permittivity of free space; and G is the perpendicular (z-axis) spacing between the two plates. Without the ability to isolate individual rectilinear components, a position sensing system cannot provide accurate information about the nature of the positional change that produces a given capacitance change. For example, a capacitance change that in fact results from z-axis displacement could be mistakenly interpreted as resulting from an x-axis displacement.

Capacitance changes resulting from y-axis motion may be eliminated by configuring the plates so that overlap between plates does not vary with the expected range of y-axis motion. FIG. 4 reveals that each of S1 plates 178 and 180 is wider in the y-direction than the M1 and M2 plates. The amount of this overage may be selected so that the overlap between the S1 plate assembly and each of the M1 and M2 plate assemblies does not change over the expected range of y-axis motion to occur between the mover and stator. Further, as described above and in the above-referenced coupling block disclosures, the x-axis coupling blocks 106a and 106b typically are designed so that they tend not to track the y-axis motion of mover 106.

The effect of relative z-axis motion is suppressed or eliminated due, in part, to the application of drive signals 200 and 202 to variable capacitors 192 and 194. Those skilled in the art will appreciate that, for M1 plate 166, M2 plate 172 and S1 plate 178, the capacitance measuring circuit shown in FIG. 8 yields a transfer function as follows:

$$\frac{Vo}{Vc} = \left(\frac{S}{S+P}\right)\left(\frac{Cxp - Cxn}{Cxp + Cxn}\right)$$

where Vo is the output taken across voltage sampling resistor 206; Vc is the non-inverted input signal; Cxp is the capacitance of variable capacitor 192; Cxn is the capacitance of variable capacitor 194; and P=1/(R1*(Cxn+Cxp)).

It will be noted that Cxp=Ap*Eo/Gp and Cxn=An*Eo/Gn, where Ap is the overlap area occurring between M1 plate 166 and S1 plate 178; Gp is the z-axis spacing between M1 plate 166 and S1 plate 178; An is the overlap occurring between M2 plate 172 and S1 plate 178; and Gn is the z-axis spacing between M2 plate 172 and S1 plate 178. In addition, Ap(x)=W*(xpo+x) and An(x)=W*(xno+x), where x is the x-axis displacement of M1 plate 166 and M2 plate 172 relative to S1 plate 178; W is the width taken along the y-axis of M1 plate 166 and M2 plate 172; xpo is the initial amount of x-axis overlap occurring between M1 plate 166 and S1 plate 178 when x=0 (assuming the position shown in FIG. 4 as the initial position); and xno is the initial amount of x-axis overlap occurring between M2 plate 172 and S1 plate 178 when x=0. Assuming perfect coplanarity of the M1 and M2 plates, they will both be equally spaced from the S1 plate such that Gp=Gn=G. Substituting these values into the above transfer function yields the following:

$$\frac{Vo}{Vc} = \frac{S}{S+P} * \frac{(Ap-An)*Eo/G}{(Ap+An)*Eo/G} = \frac{S}{S+P} * \frac{2x}{xpo+xno}$$

It will be appreciated from this result that the 1/G term cancels from the numerator and denominator of the gain term. After this cancellation, the remaining gain term is completely independent of the perpendicular spacing between the plates. This results in suppression of relative z motion as a significant contributing factor to the resulting output, such that the output is substantially independent of z-axis motion occurring between the movable objects. Having thus rejected contributions due to relative y-axis and z-axis motion, the depicted system isolates relative x-axis motion to provide output based substantially on only the x-axis component.

Though the above derivation was performed for only three plates (i.e., M1 plate 166, M2 plate 172 and S1 plate 178), the above result, and particularly the rejection of z-axis effects, applies equally well to expanded systems involving more plates, such as the embodiment shown in FIG. 4 and various other embodiments to be described below.

In the context of a device such as storage device 100, it will often be desirable to providing motion sensing along more than one axis. For example, to perform accurate read/write operations with storage device 100, it is necessary to sense the position of storage medium 106 within the x-y plane relative to casing 120. However, as discussed above, the sensor of FIGS. 4–8 is configured to sense positional changes in one direction only, namely, along the x-axis. To achieve two dimensional sensing, additional structures similar to those discussed in FIGS. 4–8 may be used for y-axis motion, typically by affixing plate assemblies similar to those already described to one or both of y-axis coupling blocks 106c and 106c (or directly to storage medium 106), and to corresponding locations on stator 120. In this two-dimensional configuration, the x-axis sensor provides x-axis sensing while suppressing y-axis and z-axis effects, and the y-axis sensor provides y-ax is sensing while suppressing x-axis and z-axis effects. This provides accurate sensing within the x-y plane, while avoiding the sensing errors that would result in many existing sensors due to relative z-axis displacement. The other embodiments described herein may similarly be configured to provide position sensing along more than just one linear axis.

In addition to isolating rectilinear motion components, the position sensors of the present invention may be configured to provide sensitive, high resolution position sensing. Indeed, increased sensitivity is one benefit of the embodiment shown in FIG. 4. Because two M1 plates and two S1 plates are used, the overlap occurring between M1 plates and S1 plates for a given amount of x displacement is larger than would occur for a single pair of overlapping plates of the same size. Accordingly, a greater capacitive change is generated for that same amount of x displacement. This increases the sensitivity of the position sensing by allowing x-axis position changes to be tracked at a higher resolution. High resolution position sensing is particularly important in MEMS applications such as the storage device described above. In these types of storage devices, sensitive, high resolution precise position control is required to accurately read and write data to the proper storage location, and to avoid erroneous overwriting of existing data.

Figure 9:
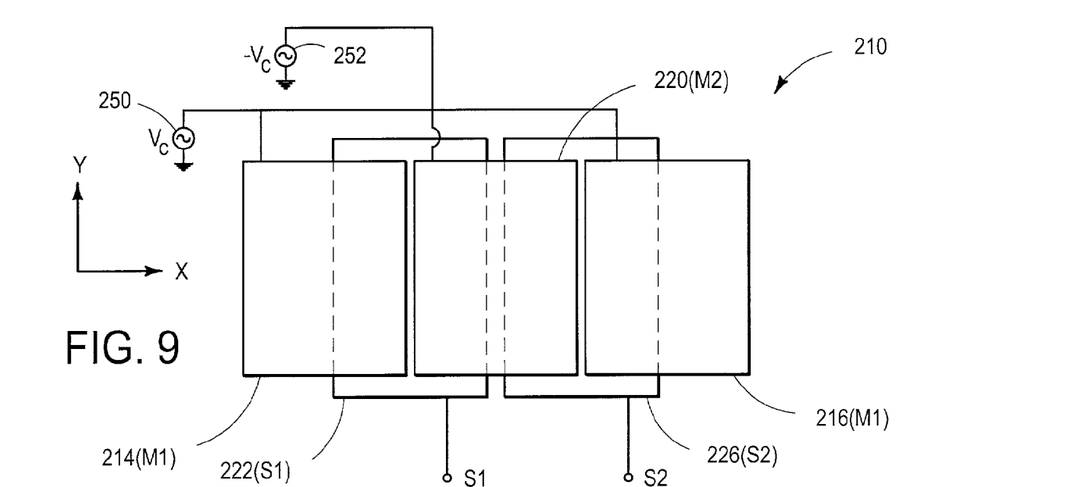
FIG. 9 is a schematic top view of another capacitance-based position sensor according to the present invention.
Figure 10:
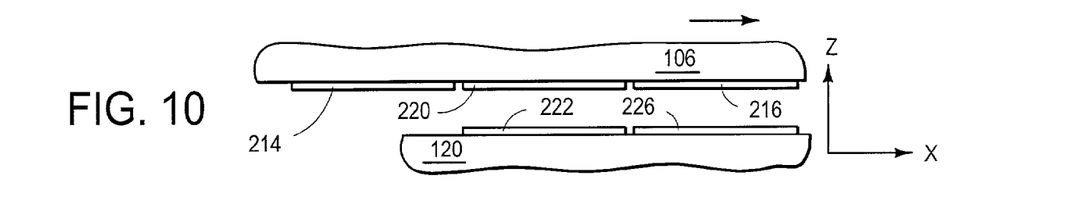
FIGS. 10–12 are side views depicting portions of the position sensor of FIG. 9, as attached to a pair of objects moving relative to one another through a range of x-axis motion.
Figure 11:
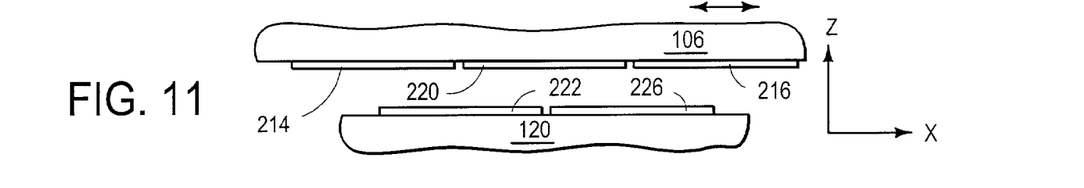
Figure 12:
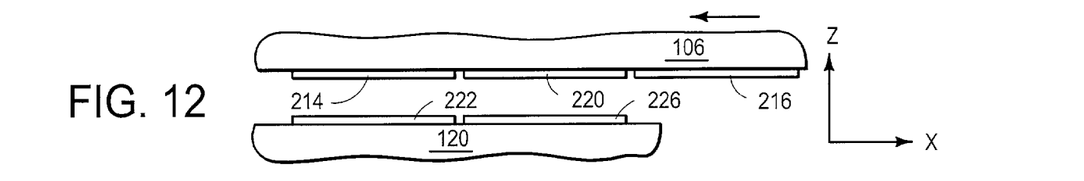

FIGS. 9–13 depict various aspects of another embodiment of a position sensing system 210 according to the present invention. Position sensing system 210 includes two M1 plates 214 and 216, and an M2 plate 220, that may be secured to the mover, similar to the previously described M1 and M2 plates. System 210 also include an S1 plate 222 and an S2 plate 226 that may be secured to stator 120. FIGS. 10–12 show relative movement of the M1 and M2 plates relative to the S1 and S2 plates, similar to FIGS. 5–7, through the operative x-axis range of motion of the objects to which the plates are secured (e.g., mover 106 and stator 120). Similar to the previous figures, FIG. 10 depicts the leftmost extreme position of the mover relative to the stator along the x-axis; FIG. 11 depicts an intermediate state; and FIG. 12 depicts the rightmost extreme.

Figure 13:
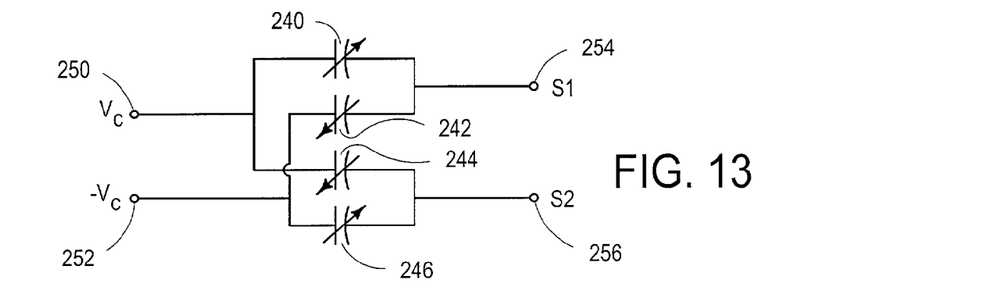
FIG. 13 is a depiction of a circuit model associated with the position sensor of FIG. 9.

Those skilled in the art will appreciate that the above arrangement produces four variable capacitors, as indicated in the circuit diagram in FIG. 13: (1) Capacitor 240 is formed between M1 plate 214 and S1 plate 222 and increases in value with positive x-axis displacement; (2) Capacitor 242 is formed between M2 plate 220 and S1 plate 222 and decreases in value with positive x-axis displacement; (3) Capacitor 244 is formed between M1 plate 216 and S2 plate 226 and decreases in value with positive x-axis displacement; and (4) Capacitor 246 is formed between M2 plate 216 and S2 plate 226 and increases in value with positive x-axis displacement.

As before, to produce a measurable output, a sinusoidal carrier 250 and its inversion 252 may be respectively applied to the M1 and M2 plates (FIGS. 9 and 13). This use of drive signals, coupled with the inversely varying capacitances, results in a system that provides outputs at the S1 and S2 terminals (254 and 256) which are largely (or completely) independent of z-axis motion occurring between mover 106 and stator 120. This may be confirmed via application of a transfer function analysis similar to the derivation discussed above with reference to FIGS. 4–8. The S1 and S2 outputs typically are subtracted prior to further processing, due to the fact that the M1-S1 capacitance (i.e. the capacitance generated between M1 plate 214 and S1 plate 222) increases when the M1-S2 capacitance (i.e., the capacitance generated between M1 plate 216 and S2 plate 226) decreases, and vice versa.

Figure 14:
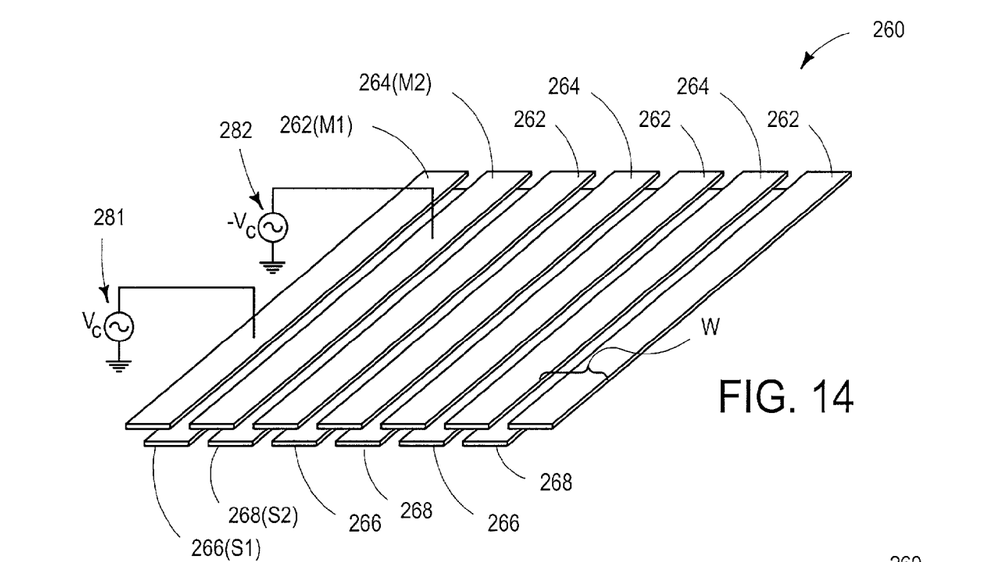
FIG. 14 is an isometric depiction of yet another position sensor according to the present invention.
Figure 15:
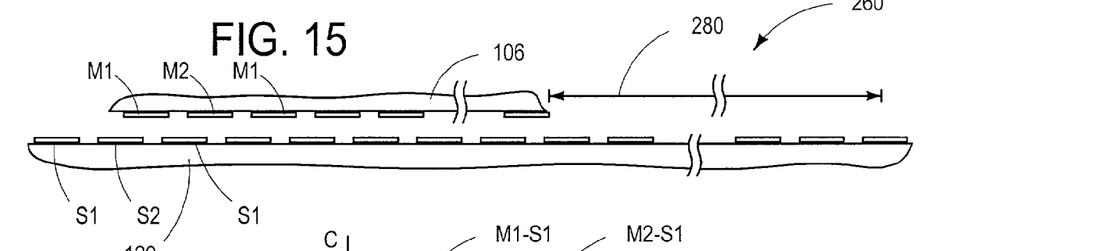
FIG. 15 is a side view depicting portions of the position sensor of FIG. 14, as attached to a pair of objects moving relative to one another through a range of x-axis motion.
Figure 16:
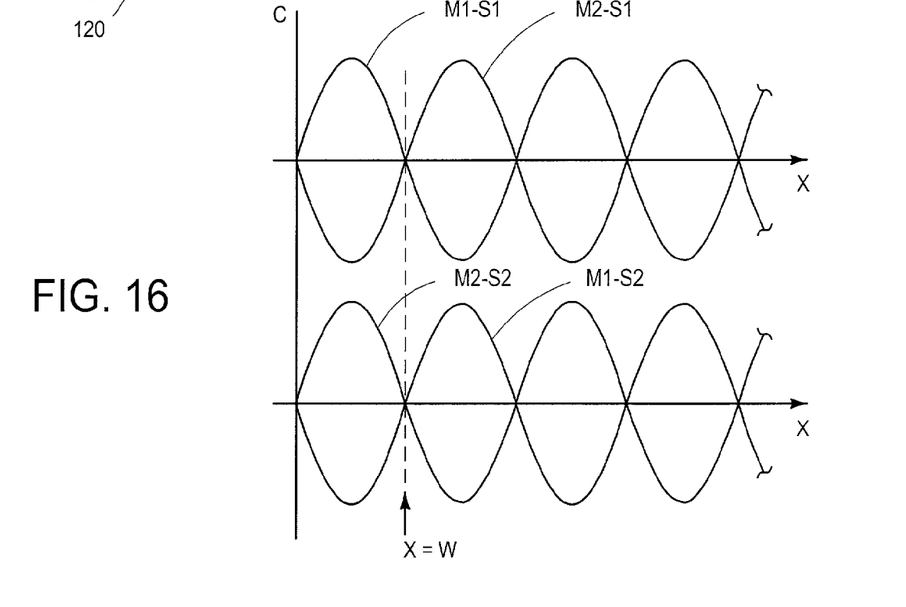
FIG. 16 is a waveform diagram showing capacitive output as a function of x-axis displacement for the position sensor of FIGS. 14 and 15.

FIGS. 14–16 depict various aspects of another embodiment of a position sensing system 260 according to the present invention. System 260 includes multiple M1 plates 262 electrically coupled together to form an M1 plate assembly (the electrical interconnections between the various M1 plates are not shown, but typically are similar to those shown in the previous embodiments). System 260 may also include multiple M2 plates 264, which are also electrically coupled together to form an M2 plate assembly. The M1 and M2 plate assemblies may be secured to a movable device, such as mover 106, and typically are configured so that the M1 and M2 plates are all coplanar and arranged in an alternating, interleaved fashion as shown in FIGS. 14 and 15.

System 260 may further include an S1 plate assembly having S1 plates 266 electrically coupled together, and an S2 plate assembly having S2 plates 268 electrically coupled together. As with the M1 and M2 plate assemblies, the S1 and S2 plates typically are all coplanar and arranged so that the S1 and S2 plates are interleaved with one another. The S1 and S2 plate assemblies are secured to another device, such as stator 120, which is movable relative to the device to which the M1 and M2 assemblies are affixed.

As with the previous embodiments, the described arrangement creates variable capacitors, having values that vary as the plate assemblies move relative to one another. In particular, the depicted configuration yields variable capacitors similar to those shown in FIG. 13: (1) a capacitor between M1 plates 262 and S1 plates 266; (2) a capacitor between M2 plates 264 and S1 plates 266; (3) a capacitor between M1 plates 262 and S2 plates 268; and (4) a capacitor between M2 plates 264 and S2 plates 268.

Typically, a sinusoidal signal 280 and its inversion 282 are respectively applied to the M1 and M2 plate assemblies, consistent with the description of the prior embodiments. Application of the sinusoidal signals produces output based on the varying capacitances which may be measured at output terminals respectively connected to the S1 and S2 plate assemblies. Accordingly, FIG. 13 accurately models the system shown in FIGS. 14 and 15.

Though the systems shown in FIGS. 9 and 14 may be described with the same circuit diagram (e.g., FIG. 13), they produce different outputs as a result of having different ranges of operative motion. For example, as seen in FIGS. 10–12, a given M1 plate (e.g., M1 plate 214) only travels relative to stator 120 a distance approximately equal to its own x-axis width. Accordingly, as M1 plate 214 moves from its leftmost extreme (FIG. 10) to its rightmost extreme (FIG. 12), its overlap with S1 plate 222 (and the resulting capacitance) increases from a minimum to a maximum value.

By contrast, in the system shown in FIGS. 14 and 15, the operative range of x-axis motion typically is many times the width of a given plate, as revealed by the depicted exemplary range 281 of x-axis motion. Accordingly, as mover 106 moves from one end of its range to the other, any given M1 or M2 plate will pass successively over an S1 plate, an S2 plate, another S1, another S2, another S1, and so on. In this configuration, there are four overlapping areas that are relevant to the four variable capacitors described above—the overlap occurring between (1) the M1 and S1 plate assemblies, (2) the M2 and S1 plate assemblies, the (3) M1 and S2 plate assemblies, and (4) the M2 and S2 plate assemblies. Each of these four overlapping areas cycles in amount between maximum and minimum values a number of times as the objects move relative to one another over the operative range of x-axis motion. As a function of x-axis displacement, each given one of these areas varies linearly between the maximum and minimum amounts.

Graphically, the overlapping area as a function of x-axis displacement for each of the four areas appears as a triangular waveform. The period of these waveforms is equal to the pitch W between adjacent plates, which includes the width of a given one of the plates, plus the relatively small gap between that plate and one of its immediately adjacent neighboring plates. Typically, as shown in FIGS. 14 and 15, system 260 is configured so that all of the plate widths and intervening gaps are uniform.

The cycling overlap produced over the operate range of motion yields cycling capacitances, as indicated by the output capacitance waves shown in FIG. 16. Specifically, the depicted outputs correspond to the M1-S1, M2-S1, M2-S2 and M1-S2 capacitances generated between the plate assemblies. Although capacitance varies linearly with overlap area, the depicted waveforms are not triangular like the overlap area function. Rather, as indicated, the waveforms appear more sinusoidal, due to fringing and other effects. The period of these waveforms is 2W, i.e. twice the width of the plate pitch.

The transfer function discussed above with reference to FIGS. 4–8 applies to the cyclic system shown in FIGS. 14 and 15, such that output contributions due to relative z-axis motion typically are completely suppressed, or at least reduced to a negligible amount. Accordingly, the output capacitances depicted in FIG. 16 may be used to accurately sense x-axis position (and y-axis position when the depicted configuration is employed with the y-axis), independent of incidental z-axis motion that may occur between the moving objects.

A significant benefit of the system shown in FIGS. 14 and 15 is increased sensitivity. Referring back to the embodiment of FIG. 4, assume that the depicted operative range of x-axis motion is 50 micrometers. Assume further that the total capacitance resulting from overlap between M1 plates 166 and 168, and S1 plates 178 and 180 varies over this range of motion from 50 picofarads to 100 picofarads. The capacitive change per x-axis displacement would be 1 picofarad per micrometer.

Referring now to the system of FIGS. 14 and 15, assume the same operative range of 50 micrometers, but with the various plates being significantly smaller than the plates shown in FIG. 4, say a hundredth of the size. Assume further that at the maximum total amount of overlap occurring between M1 plates 262 and S1 plates 266, the generated capacitance is again 100 picofarads, and at the minimum overlap, 50 picofarads. As the mover moves from x=0 micrometers to 50 micrometers, the overall capacitance between the M1 and S1 plate assemblies will cycle between 50 and 100 picofarads one hundred times. In this example, the "cyclic" configuration would produce 100 picofarads of capacitive change per micrometer of displacement, an output which is much more sensitive to changes in position. In certain applications, this will greatly improve the accuracy and precision of the sensor.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

We claim:

1. A movable system having capacitance-based position sensing, comprising:
  a pair of objects;
  an actuator configured to effect an operative range of relative motion between the objects along an axis; and
  a capacitance-based position sensor, including
    a first plate secured to one of the objects; and
    a pair of second plates secured to the other of the objects so that the second plates are adjacent and coplanar, and so that the second plates are spaced from, and parallel to, the first plate as the objects move relative to one another along the axis, and such that the second plates in use come into simultaneous overlap with the first plate,
  where the configuration of the first plate and second plates results simultaneously in two spaced-plate capacitors having capacitances that vary oppositely as the objects move relative to one another throughout the operative range along the axis, where the capacitance-based position sensor uses the capacitances to generate output usable to determine relative position of the objects along the axis throughout the operative range along the axis;
  where the capacitance-based position sensor is configured so that the output is substantially independent of perpendicular spacing variations occurring between the first plate and the second plates.

2. The movable system of claim 1, further comprising a capacitance measuring circuit configured to apply a time-varying input signal to one of the pair of second plates, and apply an inversion of the time-varying input signal to the other of the pair of second plates.

3. The movable system of claim 2, where the time-varying input signal includes a sinusoidal carrier.

4. A movable system having capacitance-based position sensing, comprising:
  a pair of objects;
  an actuator configured to effect an operative range of relative motion between the objects along an axis; and
  a capacitance-based position sensor, including
    a first plate secured to one of the objects; and
    a pair of second plates secured to the other of the objects so that the second plates are adjacent and coplanar, and so that the second plates are spaced from, and parallel to, the first plate as the objects move relative to one another along the axis, and such that the second plates in use come into simultaneous overlap with the first plate,
  where the configuration of the first plate and second plates results simultaneously in two spaced-plate capacitors having capacitances that vary oppositely as the objects move relative to one another throughout the operative range along the axis, where the capacitance-based position sensor uses the capacitances to generate output usable to determine relative position of the objects along the axis; and
  where the capacitors form part of a capacitance measuring circuit having an output-input transfer function that is substantially independent of perpendicular spacing variations occurring between the first plate and each of the second plates as a result of the pair of objects moving relative to one another.

5. The movable system of claim 1, where one of the pair of objects is a computer-readable storage medium movably mounted within an enclosure, the capacitance-based position sensor being configured to generate the output so that the output is usable to determine relative position of the storage medium to the enclosure.

6. The movable system of claim 5, further comprising a read/write device fixed to the enclosure, the read/write device being configured to read data from and write data to the storage medium.

7. A sensor that outputs varying capacitance based upon changes in relative position along an axis between a pair of objects, comprising:
  a first plate secured to one of the objects; and a pair of second plates secured to the other of the objects so that the second plates are adjacent and coplanar, and so that the second plates are spaced from and parallel to the first plate as the objects move relative to one another along the axis, and such that the second plates in use come into simultaneous overlap with the first plate, where the configuration of the first plate and second plates results simultaneously in two spaced-plate capacitors having capacitances that oppositely vary as the objects move relative to one another along the axis, where the sensor uses the capacitances to generate output usable to determine relative position of the objects along the axis;

where the sensor is configured so that the output is substantially independent of perpendicular spacing variations occurring between the first plate and the second plates.

8. The sensor of claim 7, further comprising a capacitance measuring circuit configured to apply a time-varying input signal to one of the pair of second plates, and apply an inversion of the time-varying input signal to the other of the pair of second plates.

9. The sensor of claim 8, where the time-varying input signal includes a sinusoidal carrier.

10. A sensor that outputs varying capacitance based upon changes in relative position along an axis between a pair of objects, comprising:
 a first plate secured to one of the objects; and
 a pair of second plates secured to the other of the objects so that the second plates are adjacent and coplanar, and so that the second plates are spaced from and parallel to the first plate as the objects move relative to one another along the axis, and such that the second plates in use come into simultaneous overlap with the first plate,
 where the configuration of the first plate and second plates results simultaneously in two spaced-plate capacitors having capacitances that vary oppositely as the objects move relative to one another along the axis, where the sensor uses the capacitances to generate output usable to determine relative position of the objects along the axis; and
 where the capacitors form part of a capacitance measuring circuit having an output-input transfer function that is substantially independent of perpendicular spacing variations occurring between the first plate and the second plates as a result of the pair of objects moving relative to one another.

11. A movable system having capacitance-based position sensing, comprising:
 a pair of objects;
 an actuator configured to effect relative motion between the objects along plural axes defining a plane; and
 a capacitance-based position sensor, including
  a first plate secured to one of the objects; and
  a pair of second plates secured to the other of the objects so that the second plates are adjacent and coplanar, and so that the second plates are spaced from, and parallel to, the first plate as the objects move relative to one another within the plane, and such that the second plates in use come into simultaneous overlap with the first plate,
  where the configuration of the first plate and second plates results simultaneously in two spaced-plate capacitors having capacitances that vary oppositely and continually as the objects move relative to one another throughout an entire operative range of relative motion between the first plate and the second plates within the plane, where the capacitance-based position sensor uses the capacitances to generate output usable to determine relative position of the objects within the plane;
 where the capacitance-based position sensor is configured so that the output is independent of perpendicular spacing variations occurring between the first plate and each of the second plates throughout the entire operative range of relative motion between the first plate and the second plates.

12. A movable system having capacitance-based position sensing, comprising:
 a pair of objects;
 an actuator configured to effect an operative range of relative motion between the objects along plural axes; and
 a capacitance-based position sensor, including
  a first plate secured to one of the objects; and
  a pair of second plates secured to the other of the objects so that the second plates are adjacent and coplanar, and so that the second plates are spaced from, and parallel to, the first plate as the objects move relative to one another along the plural axes, and such that the second plates in use come into simultaneous overlap with the first plate,
  where the configuration of the first plate and second plates results simultaneously in two spaced-plate capacitors having capacitances that vary oppositely as the objects move relative to one another within the operative range along the plural axes, where the capacitance-based position sensor uses the capacitances to generate output usable to determine relative position of the objects along the plural axes.

* * * * *